United States Patent [19]

Martens et al.

[11] Patent Number: 5,708,065
[45] Date of Patent: Jan. 13, 1998

[54] FIRE RESISTANT RESIN COMPOSITIONS

[75] Inventors: Marvin Michel Martens, Vienna, W. Va.; Robert Valentine Kasowski, West Chester, Pa.; Kevin Bodle Cosstick, Geneva, Switzerland; Robert Earl Penn, Wilmington, Del.

[73] Assignee: E. I. Du Pont de Nemours and Company, Wilmington, Del.

[21] Appl. No.: 770,191

[22] Filed: Dec. 19, 1996

Related U.S. Application Data

[63] Continuation-in-part of Ser. No. 577,357, Dec. 22, 1995, Pat. No. 5,618,865, and provisional application No. 60/023,395, Aug. 13, 1996.

[51] Int. Cl.$^6$ .................................................. C08K 5/34
[52] U.S. Cl. ...................... 524/100; 524/86; 524/91; 524/100; 524/115; 524/120; 524/127; 524/174; 524/186; 524/188; 525/437; 525/420
[58] Field of Search ....................... 524/86, 91, 100, 524/115, 120, 127, 174, 186, 188; 525/437, 420

[56] References Cited

U.S. PATENT DOCUMENTS

| | | | |
|---|---|---|---|
| 3,458,470 | 7/1969 | Edgar | 524/406 |
| 3,936,416 | 2/1976 | Brady et al. | 523/200 |
| 4,010,137 | 3/1977 | Brady et al. | 524/100 |
| 4,042,561 | 8/1977 | De Edwardo et al. | 524/122 |
| 4,295,886 | 10/1981 | Gresham | 106/18.19 |
| 4,298,518 | 11/1981 | Ohmura et al. | 524/101 |
| 4,526,906 | 7/1985 | Wegner | 521/107 |
| 4,535,096 | 8/1985 | Jacobs et al. | 521/107 |
| 4,670,483 | 6/1987 | Hall et al. | 523/179 |
| 4,741,740 | 5/1988 | Davis et al. | 8/490 |
| 5,071,894 | 12/1991 | Weil et al. | 524/127 |
| 5,167,876 | 12/1992 | Lom et al. | 252/602 |
| 5,424,344 | 6/1995 | Lewin | 524/83 |

FOREIGN PATENT DOCUMENTS

| | | |
|---|---|---|
| 2130793 | 6/1971 | Germany. |
| 2150484 | 10/1971 | Germany. |
| 44 36 281 A1 | 10/1994 | Germany. |

OTHER PUBLICATIONS

E. Weil and B. McSwigan, MPP in Flame–Retardant Coatings: Old Products with New Potential, *Journal of Coatings Tech.*, 66, 75, 1994.

D. Brady et al., Intumescense: A Novel Approach to Flame Retard PP, *Journal of Fire Retarant Chem.*, 4, 150, 1977.

Troitzsch, Methods for the Fire Protection of Plastics and Coatings by Flame Retardant and Intumescent Systems, *Chemische Werke Huls AD, D 437 Marl (F.R.G.)*, 41–65.

Anne E. Lipska, The Fire Retardance Effectiveness of High Molecular fWeight, High Oxygen Containing Inorganic Additives in Cellulosic and Synthetic Materials, *Combustion Institute Arizona State University, Western States, Section*, 1–39, 1973.

*Primary Examiner*—Samuel A. Acquah

[57] ABSTRACT

This invention relates to flame retardants for polyester and polyamide compositions, and specifically relates to compositions containing (1) about 30 to about 70 weight percent of a polyester or a synthetic, aliphatic polyamide or a mixture thereof; (2) about 15 to about 40 weight percent of glass or mineral reinforcing agent; and (3) a flame retardant of (a) about 20 to about 30 weight percent of melamine phosphate and up to about 10 weight percent of a charring catalyst; (b) about 15 to about 30 weight percent of melamine phosphate, up to about 10 weight percent of a charring catalyst and up to about 10 weight percent of a char former; (c) about 5 to about 45 weight percent of melamine pyrophosphate; (d) about 15 to about 30 weight percent of melamine pyrophosphate and up to about 10 weight percent of a charring catalyst; (e) about 15 to about 30 weight percent of melamine pyrophosphate, up to about 10 weight percent of a charring catalyst and up to about 10 weight percent of a char former, or (f) about 20 to about 30 weight percent melamine pyrophosphate and up to about 10 weight percent of at least one of melamine cyanurate, melamine, or zinc borate, wherein all percents by weight are based on the total weight of (1)+(2)+(3) only.

11 Claims, No Drawings

FIRE RESISTANT RESIN COMPOSITIONS

CROSS REFERENCE TO RELATED APPLICATIONS

This application is a continuation in part of prior application Ser. No. 08/577,357, filed Dec. 22, 1995, now allowed, U.S. Pat. No. 5,518,865, and further claims the benefit of U.S. provisional application No. 60/023,395, filed Aug. 13, 1996.

FIELD OF THE INVENTION

This invention relates to resin compositions which have a combination of good physical properties and good fire resistance.

TECHNICAL BACKGROUND

Synthetic resins, including polyesters and aliphatic polyamides, such as nylon-6,6 and nylon-6, and copolymers thereof, are often used for molded articles and fibers. In many uses, particularly for molded articles, it is preferred if the resin has improved resistance to fire, compared to the resin alone. This is often attained by the addition of various agents which improve the basic fire resistance of the resin, but sometimes these agents degrade or diminish other physical properties of the resin. Since resins are widely used, compositions which have improved fire resistance but yet retain the desirable physical properties of the resin are constantly being sought.

German Patents 2,150,484 and 2,130,793, and A. E. Lipska, Comb. Inst. Arizona State Univ., West. State Sect. Combust, Inst. WSCI, 1973, report that certain tungsten compounds can be used in various ways to improve the fire resistance of polyamides. The combinations of agents described hereinafter are not disclosed in these references.

U.S. Pat. No. 4,298,518 discloses compositions containing polyamides and melamine cyanurate, which are said to have good fire resistance.

U.S. Pat. No. 3,458,470 discloses compositions containing polyamides and a variety of tungsten or molybdenum compounds, including silico- and phosphotungstic acids. These compositions are said to have good resistance to discoloration and be stable to light.

Melamine phosphate may be added to synthetic resins to improve the time retardancy of the resins, but when heated to normal engineering polymer processing temperatures the melamine phosphate gives off so much water that the resultant mixture of the resin and the melamine phosphate has very poor physical properties.

What are needed, therefore, are time retardant resin compositions which do not have the problems and deficiencies of the prior art.

SUMMARY OF THE INVENTION

This invention relates to time retardants for polyester and polyamide compositions, and specifically relates to compositions containing (1) about 30 to about 70 weight percent of a polyester or a synthetic, aliphatic polyamide or a mixture there of; (2) about 15 to about 40 weight percent of glass or mineral reinforcing agent; and (3) a flame retardant of (a) about 20 to about 30 weight percent of melamine phosphate and up to about 10 weight percent of a charring catalyst; (b) about 15 to about 30 weight percent of melamine phosphate, up to about 10 weight percent of a charring catalyst and up to about 10 weight percent of a char former; (c) about 5 to about 45 weight percent of melamine pyrophosphate; (d) about 15 to about 30 weight percent of melamine pyrophosphate and up to about 10 weight percent of a charring catalyst; (e) about 15 to about 30 weight percent of melamine pyrophosphate, up to about 10 weight percent of a charring catalyst and up to about 10 weight percent of a char former, or (f) about 20 to about 30 weight percent melamine pyrophosphate and up to about 10 weight percent of at least one of melamine cyanurate, melamine, or zinc borate, wherein all percents by weight are based on the total weight of (1)+(2)+(3) only.

These compositions exhibit good fire resistance and are useful as molding resins. These compositions may also include other additional fillers and additives as are commonly known in the art.

DETAILED DESCRIPTION

The composition described herein is a resin composition having both good physical properties and good time retardancy. The composition has three components (1) a polyester or a synthetic, aliphatic polyamide or a mixture there of; (2) a glass or mineral reinforcing agent; and (3) a time retardant which includes a melamine phosphate compound and optionally a charring catalyst, a charring catalyst and a char former, melamine cyanurate, melamine or zinc borate.

The first component is a polyester or a synthetic, aliphatic polyamide or a mixture there of, which is present in an amount of about 30 to about 70 weight percent of the composition.

"Polyester" as used herein includes polymers having an inherent viscosity of 0.3 or greater and which are, in general, linear saturated condensation products of glycols and dicarboxylic acids, or reactive derivatives thereof. Preferably, they will comprise condensation products of aromatic dicarboxylic acids having 8 to 14 carbon atoms and at least one glycol selected from the group consisting of neopentyl glycol, cyclohexane dimethanol and aliphatic glycols of the formula $HO(CH_2)_nOH$ where n is an integer of 2 to 10. Up to 50 mole percent of the aromatic dicarboxylic acids may be replaced by at least one different aromatic dicarboxylic acid having from 8 to 14 carbon atoms, and/or up to 20 mole percent may be replaced by an aliphatic dicarboxylic acid having from 2 to 12 carbon atoms.

The most common polyester compositions are based on polyethylene terephthalate homopolymers, polybutylene terephthalate homopolymers, polyethylene terephthalate/polybutylene terephthalate copolymers, polyethylene terephthalate/polybutylene terephthalate mixtures and mixtures thereof, although other polyester may be used as well, alone, in combination with each other, or in combination with those polyesters listed above.

"Synthetic polyamide", as used herein, includes a polymer which is made by man, and does not include natural fibers such as wools or silks. By an "aliphatic polyamide" is meant a polymer which has repeat units which include amide groups in the main chain, and in which at least some, preferably at least 50 mole percent, of these amide groups (through the nitrogen atoms and/or carbonyl carbon atoms of the amide groups) are connected to aliphatic carbon atoms. Preferred polyamides include nylon-6,6, nylon-6, nylon 6,12, and copolymers of nylon-6,6 and nylon 6. Nylon-6,6 and nylon-6, and copolymers thereof, are especially preferred and nylon-6,6 is more preferred.

Mixtures or blends of polyesters and synthetic polyamides may also be use. Up to about 40 wt % of the polyester may be replaced by a polyamide with no deleterious effect in mechanical properties or flame retardancy. Preferably, from about 5 to about 30 wt % of the polyester may be replaced by the polyamide. In a preferred embodiment of a polyester/polyamide blend, the polyester is polybutylene terephthalate and the polyamide is nylon-6,6.

The second component in the invention is a reinforcing agent, such as a glass or mineral reinforcing agent, and which may include glass, carbon, mica and/or aramid fibers. The reinforcing agent, which is present in an amount of about 15 to about 40 weight percent, is important in obtaining the desired combination of both good physical properties and improved fire resistance in the inventive composition.

The third component of the invention is a flame retardant that includes a melamine phosphate compound and optionally either a charring catalyst or a charring catalyst and a char former. In one embodiment, the melamine phosphate compound is doped with a charring catalyst or with a charring catalyst and a char former.

The melamine phosphate compound may be melamine phosphate or melamine pyrophosphate or mixture of melamine phosphate and melamine pyrophosphate.

The flame retardant component typically contains about 5 to about 45 weight percent of the melamine phosphate compound, based on the total weight of the inventive composition. When less than 15 weight percent of the melamine phosphate compound is present, the composition is not effective as a flame retardant under UL94. However, lower amounts of the flame retardant may be effective under a flame retardant test less stringent that UL94, such as the glow wire test of International Standard IEC 695-2-1/0 1994. For synthetic polyamides, the upper amount of the melamine phosphate component is about 30 weight percent, because while it may be possible to use greater that 30 weight percent of a melamine phosphate compound, such amounts are not deemed to be practical because of the high costs of using such an amount of the melamine phosphate compound. However, even greater amounts of the melamine phosphate may be used, especially when a polyester is used.

An optional ingredient of the inventive composition that is part of the flame retardant is a charring catalyst. When melamine pyrophosphate is used as the melamine compound, the presence of the charring catalyst is not essential to the invention, but its use in conjunction with melamine pyrophosphate greatly reduces the amount of melamine pyrophosphate needed, as discussed below.

As used herein, the term "charring catalyst" includes metal salt of a tungstic acid or a complex oxide acid of tungsten and a metalloid, a tin oxide salt such as sodium tin oxide, and/or ammonium sulfamate. Preferred metal salts include alkali metal salts of a tungstic acid, with sodium tungstate being especially preferred. By a complex oxide acid of tungsten and a metalloid is meant a complex oxide acid formed by a metalloid such as phosphorous or silicon and tungsten. Preferred complex oxide acids include silicotungstic acid and phosphotungstic acid, with silicotungstic acid being especially preferred. If the charring catalyst is present as part of the flame retardant component of the inventive composition it is present in an amount up to about 10 weight percent based on the total weight of the inventive composition. A preferred range is from about 0.1 to about 10 weight percent, with a more preferred range being from about 0.1 to about 2 weight percent.

Another optional ingredient of the inventive composition that is part of the flame retardant is a char former such as a polyhydric alcohol. Other examples include novolac, vinyl alcohols and starches. In the present invention, it is preferred that the polyhydric alcohol be penterythritol or dipenterythritol. If it is present in the composition, the char former is present in amounts of up to 10 weight percent based on the total weight of the inventive composition. A preferred range is from about 0.1 to about 10 weight percent, with a more preferred range being from about 0.1 to about 2 weight percent.

Still other optional ingredients of the inventive composition that are part of the flame retardant are melamine cyanurate, melamine, and zinc borate.

The compositions described above have excellent flame retardant characteristics. However, the compositions do not always have acceptable electrical properties. An important measure of the electrical properties of a resin composition is the Comparative Tracking Index (CTI). Tracking is defined as the formation of electrically conductive paths on the surface of an insulator between two electrodes caused either through pollution or degradation of the insulator. Tracking resistance is the ability of an insulator to prevent such currents.

CTI is measured by ASTM UL 746A which is a test method that indicates the relative resistance of solid electrical insulating materials to tracking for voltages up to 600 V when the surface is exposed under electric stress to water with the addition of contaminants. The test is made on a resin specimen that is 15×15 mm, with a thickness of $\geq 3$ mm, which has voltage applied across electrodes using solution A (ammonium chloride) as a contaminant. Tracking is considered to have occurred during the test procedure if a current of 0.5 A circulates for more than 2 seconds actuating an overcurrent relay. Failure also occurs if, while there is no current and the relay was not operated, the specimen is burning. CTI is the defined as the voltage at which no tracking occurs after 50 drops of solution A, provided that at 25 V lower no tracking occurs after 100 drops of solution A.

Resin compositions that do not have good electrical properties typically have a CTI of about 300 V or lower. The resin compositions of the present invention unexpectedly have a CTI of 350 V to 600V.

The flame retardant component of the present invention includes the following combinations of a melamine phosphate compound with either a charring catalyst, a charring catalyst and a char former, melamine cyanurate, melamine or zinc borate: (a) about 20 to about 30 weight percent of melamine phosphate and up to about 10 weight percent of a charring catalyst; (b) about 15 to about 30 weight percent of melamine phosphate, up to about 10 weight percent of a charring catalyst and up to about 10 weight percent of a char former; (c) about 5 to about 45 weight percent of melamine pyrophosphate, preferably about 25 to about 45 weight percent for UL-94 V0 ratings; (d) about 15 to about 30 weight percent of melamine pyrophosphate and up to about 10 weight percent of a charring catalyst; (e) about 15 to about 30 weight percent of melamine pyrophosphate, up to about 10 weight percent of a charring catalyst and up to about 10 weight percent of a char former; or (f) about 20 to about 30 weight percent melamine pyrophosphate and up to about 10 weight percent of at least one of melamine cyanurate, melamine, or zinc borate.

By "melamine compound doped with a charring catalyst" is meant a melamine phosphate compound such as melamine pyrophospate that is made such that the charring catalyst is bound to the melamine pyrophosphate. The melamine compound doped with a charring catalyst may be made by preparing an aqueous solution of melamine, preparing an aqueous solution of silicotungstic acid or phosphotungstic acid, and preparing an aqueous solution of a phosphorous compound, such as $H_3PO_4$ (85% acid). The tungstic acid solution is added to the phosphorous solution, and then that mixture is added to the melamine solution, wherein melamine phosphate is converted to melamine pyrophosphate through the loss of a water molecule. The resulting solution is vacuum dried to produce the doped melamine phosphate compound. The mole ratio of the melamine to phosphorous in the solution should be from 2:1 to 1:2. The number of moles of the charring catalyst should be from 0.01 to 0.5 moles per mole of melamine phosphate compound, and preferably 0.1 moles per mole of melamine compound. There may not be a 100% conversion of melamine phosphate to melamine pyrophosphate when the doped melamine compound is made, so that while the doped melamine compound is primarily melamine pyrophosphate, it may also include unconverted melamine phosphate.

The melamine compound that is doped with a charring catalyst may also be made by contacting, in an aqueous medium, melamine and silicotungstic acid or phosphotungstic acid in a molar ratio of from about 1 to about 24 moles of melamine per mole of the tungsten compound to prepare "melamine salts" of the tungstic acids. It is preferred that the contacting be carried out at about 50° C. to about 100° C. It is believed that the melamine not only forms salts with the tungsten compound used, but also solvates the resulting salt much like water forms hydrates. Cyanuric acid may also be present so that the melamine forms a "mixed salt" with cyanuric acid and the silico- or phosphotungstic acid.

It has also been discovered that for compositions that include a synthetic, aliphatic polyamide and a glass or mineral reinforcing agent, melamine pyrophosphate alone is effective as a flame retardant to obtain UL-94 V0 if used in a proportion of about 25 to about 30 weight percent. As discussed above, an amount of melamine pyrophosphate of about 5 weight percent or above may be effective to pass a less stringent flame retardant test such as the glow wire test.

It has also been discovered that for compositions that include a polyester and a glass or mineral reinforcing agent, melamine pyrophosphate alone is effective as a flame retardant under UL-94 if used in a proportion of about 25 to about 45 weight percent. As discussed above, an amount of melamine pyrophosphate of about 5 weight percent or above may be effective to pass a less stringent flame retardant test such as the glow wire test.

The compositions described herein have improved fire resistance compared to the resin alone, and are particularly useful as molding resins for making parts such as electrical and electronic parts such as bobbins, coil forms, connectors, fasteners, and for parts in equipment such as circuit breakers. These compositions also retain the good physical properties of the resins, that is desirable mechanical properties particularly toughness. Toughness may be roughly estimated as being proportional to the product of the tensile strength and elongation, so the higher either or both of these are, the tougher the polymer. It is preferred that the composition be fire resistant enough so that it has a rating of V0 in the Underwriters Laboratory test UL-94, at a thickness of 0.16 cm (1/16 inch).

It is well known that lower levels of the flame retardants disclosed herein may be successfully used to prepare compositions which meet flame retardant tests less demanding than Underwriters Laboratory test UL-94. For example, lower amounts of the inventive flame retardants may be used in combination with a resin and a reinforcing agent and still pass the glow wire test under less demanding conditions, specifically at temperatures lower than 960C and/or at higher thicknesses than 1.5 min. The glow wire test is International Standard IEC 695-2-1/0 1994.

It is also preferred that the melamine phosphate compound, reinforcing agent and flame retardant, such as the charring catalyst, be relatively well dispersed in the resin. A preferred degree of dispersion can be attained by producing the composition in any of a number of different types of equipment which are commonly used to disperse materials in polymers. For instance, a twin screw extruder with appropriate mixing screw sections can be used to satisfactorily melt mix the ingredients. It is also believed that the dispersion of the charring catalyst in the polymer is aided by starting with tungsten compound having relatively small particle sizes.

It has also been discovered that the elongation of molded bars made from the inventive composition may be unexpectedly increased by adding to the composition a compatabilizer such as a silane compound. An example of an acceptable silane compound is triethoxy(3-aminoproply) silane sold under the trade name A1100 by Aldrich Chemical Company of Milwaukee, Wis. The silane compound may be added to the composition by any conventional method. A preferred method is that the silane is first coated onto the melamine phosphate compound before the melamine phosphate compound is added to the other components of the inventive composition. Alternatively, the silane may be added to the resin and/or reinforcing agent, which is then mixed with the melamine phosphate compound.

The silane compound may be present in any amount up to about 0.4 weight percent, based on the total weight of the resin, reinforcing agent, flame retardant and silane compound only. A preferred range is from 0.01 to 0.4 weight percent, and a more preferred range is from 0.1 to 0.3 weight percent.

In a preferred embodiment, a flow enhancer may be added to the composition to improve the flow. An example of an acceptable flow enhancer is dodecanedioic acid (DDDA), available from E.I. du Pont de Nemours and Company of Wilmington, Del. When a flow enhancer is used with the compositions of the invention, it is preferred that the flow enhancer be used in an amount of from about 0.25 to about 0.5 weight percent, based only on the total weight percent of the resin, reinforcing agent, flame retardant and, if present, silane compound.

EXAMPLES

The following abbreviations are used in the Examples and the Tables set out below:

RM—reinforcing material
MPC—melamine phosphate compound
CC—charring catalyst
CF—char former
MP—melamine phosphate
MPP—melamine pyrophosphate
PTA—phosphotungstic acid
STA—silicotungstic acid
NYADG—wollastonite
NATO—sodium tin oxide
MC—melamine cyanurate
M—melamine
ZB—zinc borate
PBT—polybutylene terephthalate
PET—polyethylene terephthalate
TS—tensile strength
EL—elongation
EBS—Acrawax C Unless otherwise indicated, the following procedure was used in the examples. The resin used in the Example was ground, and then the resin, a reinforcing material, a melamine phosphate compound, a charring catalyst, a charring catalyst and a char former, melamine cyanurate, melamine, or zinc borate were thoroughly mixed, which usually took about 30 minutes. In the examples where a doped melamine compound was used, the doped melamine compound was prepared as set forth in the Example, and then was thoroughly mixed with the resin and reinforcing material.

The resin mixture was then dried under standard conditions, and then extruded on either a 28 mm or a 30 mm Werner & Pfleiderer twin screw extruder, using a screw design having a mid range screw severity, at a melt temperature of 270°–300° C., and at rates of 11.3–15.9 kg per hour. Bars of 1/16" were molded on a 0.043 kg (1.5 oz) molding machine. Standard molding conditions for the resin mixtures were used.

These resin mixtures were then molded into bars using typical injection molding machines, ranging from laboratory sized machines to commercial sized machines. Melt temperatures were typically about 280°–300° C., and mold temperatures were typically 45°–100° C. The molded bars were then tested for a flammability rating in the UL-94 test at 0.16 cm thickness, unless otherwise indicated.

EXAMPLES—NYLON 6,6 RESIN

In the following Examples, Zytel® 101 nylon 6,6 resin sold by DuPont was used. The data from these Examples are summarized in Tables 1 and 2.

EXAMPLES 1–3

In these Examples, molded bars were made using glass as the reinforcing material, melamine phosphate sold by Chemie Linz of Linz, Austria, under the trade name MELAPUR-MPH as the melamine phosphate compound, and phosphotungstic acid as the charring catalyst. The compositions in these Examples were all V0 under UL94.

EXAMPLE 4

A molded bar was made as in Examples 1–3, except that silicotungstic acid was used as the charring catalyst. The composition passed UL94 with a V0 rating.

EXAMPLE 5 AND COMPARATIVE EXAMPLE 6

Molded bars were made as in Example 4, except that 30.0 wt. % NYADG filler was used as the reinforcing agent. Example 5 had 25.0 wt % melamine phosphate and 1 wt % silicotungstic acid and passed UL94 with a V0, but Example 6 had only 15.0 wt % melamine phosphate and 1 wt % silicotungstic acid and did not pass UL94.

EXAMPLES 7–10

In these Examples, molded bars were made using melamine pyrophosphate as the melamine phosphate compound, and no charring catalyst was used. The melamine pyrophosphate is available from Cytek of West Patterson, N.J., and is sold under the trade name AERO-GUARD MPP. The Examples show that at a melamine phosphate compound loading of 25 to 30 wt % the compositions are all V0. Examples 7 and 8 produced some foam on extrusion. In Examples 9 and 10 the melamine pyrophosphate was heated at 270° C. for 15 minutes before it was added to the resin and glass, which resulted in a significant improvement it the flame retardancy of the melamine pyrophosphate.

EXAMPLE 11

In this Example, molded bars were made as in Example 7 except that a charring catalyst was added to the composition. There was greatly reduced foaming in this Example compared to Examples 7 and 8, and the composition was V0.

EXAMPLE 12

A molded bar was made with glass and a melamine phosphate compound doped with a charring catalyst made by making a solution of 98 g. of melamine in 700 g water and a solution of 12 g of silicotungstic acid in 12 g. water which was added into 84 g. $H_3PO_4$ (85% acid) in 300 g water. The two solutions were mixed together and then vacuum dried at 90° C. The composition was V0.

EXAMPLE 13

A molded bar was made as in Example 1, except that the melamine phosphate compound was doped with the charring catalyst by making a solution of 98 g. of melamine in 700 g water and a solution of 2 g of silicotungstic acid in 12 g. water which was added into 84 g. $H_3PO_4$ (85% acid) in 300 g water. The two solutions were mixed together and then vacuum dried at 90° C. The composition was V0.

EXAMPLE 14

A molded bar was made as in Example 13, except that the melamine phosphate compound was doped with the charring catalyst by making a solution of 98 g. of melamine in 700 g water and a solution of 12 g of silicotungstic acid in 12 g. water which was added into 84 g. $H_3PO_4$ (85% acid) in 300 g water. The two solutions were mixed together and then vacuum dried at 90° C. The composition was V0.

EXAMPLE 15

A molded bar was made as in Example 13, except that the melamine phosphate compound was doped with the charring catalyst by making a solution of 98 g. of melamine in 700 g water and 5 g $Na_2SnO_3$ in 300 g water and a solution of 84 g. $H_3PO_4$ (85% acid) in 300 g water. The two solutions were mixed together and then vacuum dried at 90° C. The composition was V0.

EXAMPLES 16–17

Molded bars were made as in Example 13, except that the melamine phosphate compound was doped with the charring catalyst by making a solution of 98 g. of melamine in 700 g water and a solution of 16 g of phosphotungstic acid in 20 g. water which was added into 84 g. $H_3PO_4$ (85% acid) in 300 g water. The two solutions were mixed together and then vacuum dried at 90° C. The compositions were V0.

EXAMPLE 18

A molded bar was made as in Example 14, except that the bar was made to a thickness of 1/32 inch. This composition was V0.

EXAMPLES 19–20

Molded bars were made as in the previous Example, except that the melamine phosphate compound was doped with the charring catalyst by making a solution of 98 g. of melamine phosphate in 700 g water and a solution of 1 g of silicotungstic acid in 20 g. water. The two solutions were mixed together and then vacuum dried at 90° C. The compositions were V0.

EXAMPLES—POLYESTER RESIN

Molded bars were made as in the previous Examples, except that Rynite® polyester sold by DuPont of Wilmington, Del. or Crystar® 3935 polyester sold by Shell of Houston, Tex., was used as the resin. These results are summarized in Tables 3 and 4.

COMPARATIVE EXAMPLE 21

A molded bar was made using Rynite® 3934 polyester resin and melamine phosphate but no charring catalyst. The composition failed UL94.

EXAMPLES 22, 24 AND 26–27 AND COMPARATIVE EXAMPLES 23 AND 25

In these Examples, molded bars were made as in Example 21 except that silicotungstic acid was used as a charring catalyst. Examples 22 and 24 were V0. Example 23 was almost V0, but was a V2 because of the low amount of melamine phosphate relative to the charring catalyst.

Example 25 failed because of a low amount of melamine phosphate relative to the charring catalyst. Examples 26 and 27 were V0.

EXAMPLES 28–29 and COMPARATIVE EXAMPLE 30

Molded bars were made as in Example 21, except that silicotungstic acid and a char former of dipentaerythritol were compounded with the resin. The molded bars for Examples 28 and 29 were V0. Comparative Example 30 failed because of the insufficient amount of melamine phosphate present.

EXAMPLES 31–32

Molded bars were made as in Example 21, except that the melamine phosphate compound was melamine pyrophosphate. The compositions were V0.

EXAMPLE 33

Molded bars were made as in Example 31, except that a charring catalyst was added to the composition. The composition was V0.

EXAMPLE 34

A molded bar was made as in Example 21, except that the melamine phosphate compound was doped with the charring catalyst by making a solution of 98 g. of melamine in 700 g water and a solution of 16 g of silicotungstic acid in 20 g. water which was added into 84 g. $H_3PO_4$ (85% acid) in 300 g water. The two solutions were mixed together and then vacuum dried at 90° C. The composition was V0.

EXAMPLE 35

A molded bar was made as in Example 21, except that the melamine phosphate compound was doped with the charring catalyst by making a solution of 98 g. of melamine in 700 g water and a solution of 16 g of phosphotungstic acid in 20 g. water which was added into 84 g. $H_3PO_4$ (85% acid) in 300 g water. The two solutions were mixed together and then vacuum dried at 90° C. The composition was V0.

EXAMPLES 36–37

Molded bars were made as in Example 21, except that Crystar® 3935 polyester resin was used and the melamine phosphate compound was doped with the charring catalyst as made in Example 16. The compositions were V0.

EXAMPLES 38–39

Molded bars were made as in Example 36 except that the melamine phosphate compound was doped with the charring catalyst as made in Example 19. The compositions were V0.

EXAMPLES 40–41 AND COMPARATIVE EXAMPLE 42

Molded bars were made as in the previous Example, except that Rynite® 3934 polyester resin was used. The compositions were V0. Example 42 included 15 wt % of the doped melamine phosphate compound, and failed the UL test.

EXAMPLES—NYLON 6 RESIN

Molded bars were made as in the previous Examples, except that Ultramid B3 nylon 6 sold by BASF of Ludwigshafen, Germany was used as the resin. These results are summarized in Table 5.

EXAMPLE 43

A molded bar made from Ultramid nylon 6 resin, glass reinforcing material, and a melamine phosphate compound doped with the charring catalyst made by making a solution of 98 g. of melamine in 700 g water and a solution of 16 g of silicotungstic acid in 30 g. water which was added into 84 g. $H_3PO_4$ (85% acid) in 300 g water. The two solutions were mixed together and then vacuum dried at 90° C. The composition was V0.

EXAMPLES 44–45

Molded bars were made as in the previous Example, except that the melamine phosphate compound was doped with the charring catalyst as made in Example 16. The composition from Example 44 was V0, but the composition from Example 45 V0 failed UL94.

EXAMPLES 46–47

Molded bars were made as in Example 43, except that the melamine phosphate compound was doped with the charring catalyst as made in Example 19. The composition from Example 46 was V0, but the composition from Example 47 V0 failed UL94.

EXAMPLES—NYLON 6, 6 AND CTI MEASUREMENTS

Molded bars were made in the previous examples, except that nylon 6, 6 was used as the resin and the CTI of the molded bars were measured. The data from these Examples are summarized in Table 6.

COMPARATIVE EXAMPLE 48 AND EXAMPLES 49–52

In these Examples, molded bars were made in which melamine pyrophosphate was used as the melamine phosphate compound and glass was used as the reinforcing material. The compositions were tested for flammability using the UL94 test procedure, and the CTI of the bars were measured using the ASTM UL 746A test method described above.

In Comparative Example 48, melamine pyrophosphate was used alone. While the composition had an acceptable UL94 rating, it had an unacceptably low CTI result.

In Example 49 a molded bar was made using 5 weight percent melamine cyanurate in addition to melamine pyrophosphate which resulted in a composition having an acceptable UL94 and CTI result. The same acceptable results were obtained in Example 51 by using 10 weight percent melamine cyanurate.

In Example 50 melamine was substituted for the melamine cyanurate of Example 49 and produced a composition having an acceptable UL94 and CTI result. Similarly, in Example 51 zinc borate was substituted for the melamine cyanurate of Example 49 and produced a composition having an acceptable UL94 and CTI result.

EXAMPLES—POLYBUTYLENE TEREPHTHALATE

In the following Examples, molded bars were made as in the previous Examples except that the resin used was polybutylene terephthalate or mixtures of polybutylene terephthalate and polyethylene terephthalate. The polybutylene terephthalate used was Valox 307 available from General Electric, and the polyethylene terephthalate used was Crystar 3934 available from the DuPont Company. The data from these Examples are summarized in Table 7.

EXAMPLES 53–63

In these Examples, molded bars were made using PBT or PBT and PET with varying amounts of glass fiber reinforcing material and melamine pyrophosphate. All of the molded bars at 3.2 mm were V0. All the compositions were V0 at 1.6 mm, except for the composition made in Example 55 which was V1.

EXAMPLES—POLYBUTYLENE TEREPHTHALATE/NYLON-6,6 BLENDS

In the following Examples, molded bars were made as in the previous Examples 53–63 except that the resin used was a blend of polybutylene terephthalate and nylon-6,6.

EXAMPLES 64–67

In these Examples, molded bars were made using blends of PBT and nylon-6,6. The bars included about 20 wt % of glass fiber and about 32 wt % melamine pyrophosphate. The molded bars tested at 1.6 mm were V0 except for Example 67, which was V1.

These Examples demonstrate that flame retardancy is improved by replacing a portion of the PBT with nylon-6,6. It is preferred that the nylon-6,6 comprise no more than about 30 wt % of the PBT/nylon-6,6 mixture.

EXAMPLES—SILANE ADDITIVE

Molded bars were made as in Example 7 using nylon-6,6, glass and melamine pyrophosphate, except that the composition also included a silane compound as a compatabilizer. The composition included from about 0.14 to 0.28 wt % of a silane compound, about 46.7 wt % nylon-6,6, about 25.1 wt % glass and about 28 wt % melamine pyrophosphate, based on the total weight of resin, glass, melamine pyrophosphate and silane compound only. In these Examples, the silane was triethoxy(3-aminopropyl) silane, sold under the trade name A1100 by Aldrich Chemical Company of Milwaukee, Wis.

In each of Examples 68–79, a flow enhancer was added to the composition to improve the flow. The flow enhancer used in Examples 68–79 was dodecanedioic acid (DDDA), available from E.I. du Pont de Nemours and Company of Wilmington, Del., at a loading of 0.25 weight percent. When a flow enhancer is used with the compositions of the invention, it is preferred that the flow enhancer be used in an amount of from about 0.25 to about 0.5 weight percent, based only on the total weight percent of the resin, reinforcing agent, flame retardant and, if present, silane compound.

COMPARATIVE EXAMPLES 68–71

Examples 68–71 were Comparative Examples in which no silane compound was used. The elongation and tensile strength of the molded bars were measured using ASTM D638, and the notch izod data were measured using ASTM D256.

EXAMPLES 72–75

In these Examples, the MPP was coated with silane by adding MPP powder and A1100 silane together, without the nylon-6,6 present, and mixing the MPP and the silane in a high-speed mixer made by Well-X Corporation. The results of these Examples show that the compositions were V0. The elongation data for these Examples shows that when the MPP was coated with the silane, there was up to a 24% improvement in elongation with no deterioration in other mechanical properties.

EXAMPLES 76–79

In these Examples molded bars were made as Examples 72–75, except that the silane was added to the nylon-6,6 without the MPP being present. The nylon-6,6 and silane were mixed for 15 minutes, and then the MPP and glass were added to the container and mixed vigorously.

Molded bars were made as the previous Examples. The elongation data show that there is up to about an 8% improvement in elongation with no deterioration in mechanical properties of the molded bars compared to the Comparative Examples. All the compositions were V0.

EXAMPLES—NYLON-6,6 AND WOLLASTONITE

In the following Examples, wollastonite (NYADG) was used as the reinforcing agent.

EXAMPLES 80–82

In these Examples, molded bars were made as in Example 7, except that the reinforcing agent was NYADG. In Examples 80 and 81, zinc borate was included in the composition, and the molded bars were V0 at 1.6 mm. Example 83 included DDDA, but no zinc borate, and the molded bar was V0 at 0.8 mm.

EXAMPLES—GLOW WIRE TEST

As discussed above, the glow wire test is a flammability test that is less strict that UL94. The following Examples show that compositions of this invention with lower loadings of flame retardant pass the glow wire test.

EXAMPLES 84–89

Mold bars are made as in Example 7. The resin used is nylon-6,6, the reinforcing material is NYADG, and the flame retardant is MPP.

The molded bars are tested using the glow wire test IEC 695-2-1 at a temperature of 96° C. and a bar thickness of 1.5 mm. All the molded bars pass the glow wire test.

EXAMPLES 80–95

Molded bars are made as in the previous Examples 84–89, except that glass is used as the reinforcing agent. These compositions also include 0.25 wt. % DDDA. All the molded bars pass the glow wire test.

TABLE 1

| | | EXAMPLES WITH NYLON 6,6 RESINS | | | | | | |
|---|---|---|---|---|---|---|---|---|
| Ex. No. | wt % resin | RM | wt % RM | MPC | wt % MPC | CC | wt % CC | UL94 |
| 1 | 50.3 | glass | 24.4 | MP | 24.4 | PTA | 1.1 | V0 |
| 2 | 49.7 | glass | 24.3 | MP | 24.3 | PTA | 1.7 | V0 |
| 3 | 49.4 | glass | 24.2 | MP | 24.2 | PTA | 2.2 | V0 |
| 4 | 50.2 | glass | 25.0 | MP | 23.1 | STA | 1.7 | V0 |
| 5 | 44.0 | NYADG | 30.0 | MP | 25.0 | STA | 1.0 | V0 |

TABLE 1-continued

EXAMPLES WITH NYLON 6,6 RESINS

| Ex. No. | wt % resin | RM | wt % RM | MPC | wt % MPC | CC | wt % CC | UL94 |
|---|---|---|---|---|---|---|---|---|
| C6* | 54.0 | NYADG | 30.0 | MP | 15.0 | STA | 1.0 | V2 |
| 7 | 50.0 | glass | 25.0 | MPP | 25.0 | | | V0 |
| 8 | 45.0 | glass | 25.0 | MPP | 30.0 | | | V0 |
| 9 | 50.0 | glass | 25.0 | MPP | 25.0 | | | V0 |
| 10 | 45.0 | glass | 25.0 | MPP | 30.0 | | | V0 |
| 11 | 50.0 | glass | 25.0 | MPP | 24.0 | STA | 1.0 | V0 |

"C" INDICATES A COMPARATIVE EXAMPLE

TABLE 2

EXAMPLES WITH NYLON 6,6 RESINS AND DOPED MELAMINE COMPOUND

| Ex. No. | wt % resin | RM | wt % RM | DOPED MPC wt % | CC | UL94 |
|---|---|---|---|---|---|---|
| 12 | 50.0 | glass | 25.0 | 25.0 | STA | V0 |
| 13 | 50.0 | glass | 25.0 | 25.0 | STA | V0 |
| 14 | 50.0 | glass | 25.0 | 25.0 | STA | V0 |
| 15 | 50.0 | glass | 25.0 | 25.0 | NATO | V0 |
| 16 | 50.0 | glass | 25.0 | 25.0 | PTA | V0 |
| 17 | 55.0 | glass | 25.0 | 20.0 | PTA | V0 |
| 18 | 50.0 | glass | 25.0 | 25.0 | STA | V0 |
| 19 | 50.0 | glass | 25.0 | 20.0 | STA | V0 |
| 20 | 55.0 | glass | 25.0 | 20.0 | STA | V0 |

TABLE 3

EXAMPLES WITH POLYESTER RESINS

| Ex. No. | wt % resin | RM | wt % RM | MPC | wt % MPC | CC | wt % CC | CF | wt % CF | UL94 |
|---|---|---|---|---|---|---|---|---|---|---|
| C21 | 50.0 | glass | 25.0 | MP | 25.0 | | | | | fail |
| 22 | 49.5 | glass | 24.75 | MP | 24.75 | STA | 1.0 | | | V0 |
| C23 | 53.7 | glass | 25.2 | MP | 20.1 | STA | 1.0 | | | V2 |
| 24 | 44.0 | glass | 25.0 | MP | 30.0 | STA | 1.0 | | | V0 |
| C25 | 58.4 | glass | 24.8 | MP | 14.8 | STA | 2.0 | | | fail |
| 26 | 53.4 | glass | 24.7 | MP | 19.9 | STA | 2.0 | | | V0 |
| 27 | 48.0 | glass | 30.0 | MP | 20.0 | STA | 2.0 | | | V0 |
| 28 | 52.0 | glass | 30.0 | MP | 15.0 | STA | 1.0 | DIPEN | 2.0 | V0 |
| 29 | 48.0 | glass | 30.0 | MP | 20.0 | STA | 1.0 | DIPEN | 1.0 | V0 |
| C30 | 54.5 | glass | 30.0 | MP | 12.5 | STA | 1.0 | DIPEN | 2.0 | fail |
| 31 | 50.0 | glass | 25.0 | MPP | 25.0 | | | | | V0 |
| 32 | 45.0 | glass | 25.0 | MPP | 30.0 | | | | | V0 |
| 33 | 50.0 | glass | 25.0 | MPP | 24.0 | STA | 1.0 | | | V0 |

TABLE 4

EXAMPLES WITH POLYESTER RESINS AND DOPED MELAMINE COMPOUND

| Ex. No. | wt % resin | RM | wt % RM | DOPED MPC wt % | CC | UL94 |
|---|---|---|---|---|---|---|
| 34 | 50.0 | glass | 25.0 | 25.0 | STA | V0 |
| 35 | 50.0 | glass | 25.0 | 25.0 | PTA | V0 |
| 36 | 50.0 | glass | 25.0 | 25.0 | PTA | V0 |
| 37 | 55.0 | glass | 25.0 | 20.0 | STA | V0 |
| 38 | 50.0 | glass | 25.0 | 25.0 | STA | V0 |
| 39 | 55.0 | glass | 25.0 | 20.0 | STA | V0 |
| 40 | 50.0 | glass | 25.0 | 25.0 | STA | V0 |
| 41 | 55.0 | glass | 25.0 | 20.0 | STA | V0 |
| C42 | 60.0 | glass | 25.0 | 15.0 | STA | fail |

TABLE 5

EXAMPLES WITH NYLON 6 RESINS AND DOPED MELAMINE COMPOUND

| Ex. No. | wt % resin | RM | wt % RM | DOPED MPC wt % | CC | UL94 |
|---|---|---|---|---|---|---|
| 43 | 50.0 | glass | 25.0 | 25.0 | STA | V0 |
| 44 | 50.0 | glass | 25.0 | 25.0 | PTA | V0 |
| C45 | 55.0 | glass | 25.0 | 20.0 | PTA | fail |
| 46 | 50.0 | glass | 25.0 | 25.0 | STA | V0 |
| C47 | 55.0 | glass | 25.0 | 20.0 | STA | fail |

TABLE 6

EXAMPLES WITH MELAMINE PYROPHOSPHATE AND MELAMINE CYANURATE, MELAMINE OR ZINC BORATE

| Example No. | wt. % N6,6 | wt % glass | wt. % MPP | wt. % MC | wt. % M | wt. % ZB | UL94 | CTI(V) |
|---|---|---|---|---|---|---|---|---|
| C48 | 44.9 | 25.1 | 30 | | | | V0 | 275 |
| 49 | 44.9 | 25.1 | 25 | 5 | | | V0 | 400 |
| 50 | 44.9 | 25.1 | 25 | | 5 | | V0 | 400 |
| 51 | 44.9 | 25.1 | 20 | 10 | | | V1 | 350 |
| 52 | 44.9 | 25.1 | 25 | | | 5 | V0 | 600 |

TABLE 7

EXAMPLES WITH PBT

| Ex. no. | PBT | PET | glass fiber | MPP | UL94 (3.2 mm) | UL94 (1.6 mm) |
|---|---|---|---|---|---|---|
| 53 | 25.4 | 9.6 | 32.5 | 32.5 | V0 | V0 |
| 54 | 37.4 | — | 22.0 | 40.6 | V0 | V0 |
| 55 | 42.2 | — | 20.3 | 37.5 | V0 | V1 |
| 56 | 39.2 | — | 20.3 | 40.5 | V0 | V0 |
| 57 | 36.1 | — | 20.3 | 43.6 | V0 | V0 |
| 58 | 41.6 | — | 20.5 | 37.9 | V0 | V0 |
| 59 | 40.9 | — | 20.8 | 38.3 | V0 | V0 |
| 60 | 40.2 | — | 21.0 | 38.8 | V0 | V0 |
| 61 | 33.1 | — | 32.4 | 34.5 | V0 | V0 |
| 62 | 22.7 | 9.9 | 33.7 | 33.7 | V0 | V0 |
| 63 | 32.6 | — | 33.7 | 33.7 | V0 | V0 |

TABLE 8

EXAMPLES WITH PBT/NYLON-6,6 BLENDS

| Ex. No. | PBT | N 6,6 | % N 6,6 in PBT/N 6,6 Blend | MPP | Glass Fiber | TS (Kpsi) | EL (%) | UL94 (1.6 mm) |
|---|---|---|---|---|---|---|---|---|
| 64 | 45 | 2.5 | 5.3 | 32.3 | 20.2 | 13.1 | 1.48 | HB |
| 65 | 39.9 | 7.6 | 16.0 | 32.3 | 20.2 | 15.7 | 2.15 | V0 |
| 66 | 34.9 | 12.6 | 26.5 | 32.3 | 20.2 | 15.3 | 1.90 | V0 |
| 67 | 29.8 | 17.7 | 37.3 | 32.3 | 20.2 | 15.2 | 1.83 | V1 |

TABLE 9

SILANE ADDITIVE

| Ex. No. | Silane wt. % | Silane | UL94 (1.6 mm) | TS (Kpsi) | EL (%) | Notched Izo (ft-lb/in) |
|---|---|---|---|---|---|---|
| C68 | 0 |  | V0 | 22.0 | 2.3 | 1.3 |
| C69 | 0 |  | V0 | 21.2 | 2.2 | 1 3 |
| C70 | 0 |  | V0 | 20.8 | 2.1 | 1.2 |
| C71 | 0 |  | V0 | 22.0 | 2.2 | 1.3 |
| 72 | 0.28 | Coated | V0 | 24.6 | 2.8 | 1.4 |
| 73 | 0.14 | Coated | V0 | 24.9 | 2.7 | 1.5 |
| 74 | 0.28 | Coated | V0 | 24.1 | 2.6 | 1.4 |
| 75 | 0.14 | Coated | V0 | 23.3 | 2.4 | 1.3 |
| 76 | 0.28 | Pellets | V0 | 23.1 | 2.5 | 1.2 |
| 77 | 0.28 | Pellets | V0 | 22.7 | 2.3 | 1.3 |
| 78 | 0.14 | Pellets | V0 | 21.9 | 2.2 | 1.3 |
| 79 | 0.14 | Pellets | V0 | 22.3 | 2.3 | 1.2 |

TABLE 10

NYLON-6,6 AND WOLLASTONITE

| Ex. No. | N 6,6 | MPP | NYADG | ZB | EBS | DDDA | UL94 (1.6 mm) |
|---|---|---|---|---|---|---|---|
| 80 | 49.75 | 28 | 20 | 2 | 0.25 | 0 | V0 |
| 81 | 49.75 | 28 | 20 | 2 | 0.25 | 0 | V0 |
| 83 | 44.5 | 30 | 25 | 0 | 0.25 | 0.5 | V0 (0.8 mm) |

TABLE 11

NYLON-6,6 AND MPP - GLOW WIRE TEST

| Ex. No. | N 6,6 | RM | TYPE OF RM | MPP | ZB | EBS | DDDA | GW960 |
|---|---|---|---|---|---|---|---|---|
| 84 | 64.75 | 25 | NYADG | 10 | 0 | 0.25 |  | pass |
| 85 | 59.75 | 25 | NYADG | 15 | 0 | 0.25 |  | pass |
| 86 | 54.75 | 25 | NYADG | 20 | 0 | 0.25 |  | pass |
| 87 | 64.75 | 25 | NYADG | 8 | 2 | 0.25 |  | pass |
| 88 | 59.75 | 25 | NYADG | 13 | 2 | 0.25 |  | pass |
| 89 | 54.75 | 25 | NYADG | 18 | 2 | 0.25 |  | pass |
| 90 | 64.5 | 25 | GLASS | 10 | 0 | 0.25 | 0.25 | pass |
| 91 | 59.5 | 25 | GLASS | 15 | 0 | 0.25 | 0.25 | pass |
| 92 | 54.5 | 25 | GLASS | 20 | 0 | 0.25 | 0.25 | pass |
| 93 | 64.5 | 25 | GLASS | 8 | 2 | 0.25 | 0.25 | pass |
| 94 | 59.5 | 25 | GLASS | 13 | 2 | 0.25 | 0.25 | pass |
| 95 | 54.5 | 25 | GLASS | 18 | 2 | 0.25 | 0.25 | pass |

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

In addition to the components discussed above, the compositions of this invention may contain additives commonly employed with synthetic resins, such as colorants, mold release agents, antioxidants, tougheners, nucleating agents, ultraviolet light and heat stabilizers and the like. An example of a common filler is magnesium hydroxide.

What is claimed is:

1. A composition comprising:
   (1) about 30 to about 70 weight percent of a polyester or a synthetic, aliphatic polyamide or a mixture thereof;
   (2) about 15 to about 40 weight percent of a reinforcing agent; and
   (3) a flame retardant selected from the group consisting of
      (a) about 5 to about 20 weight percent of melamine pyrophosphate;
      (b) about 32.5 to about 45 weight percent of melamine pyrophosphate; or
      (c) about 20 to about 30 weight percent melamine pyrophosphate and up to about 10 weight percent of at least one of melamine or zinc borate
   wherein all percents by weight are based on the total weight of (1)+(2)+(3) only.

2. The composition of claim 1 wherein said polyamide is nylon-6,6, nylon-6, copolymers thereof or mixtures thereof.

3. The composition of claim 1 wherein said polyester is polyethylene terephthalate, polybutylene terephthalate, polyethylene terephthalate/polybutylene terephthalate copolymers or polyethylene terephthalate/polybutylene terephthalate mixtures.

4. The composition of claim 3 wherein the flame retardant is 3(a).

5. The composition of claim 1 wherein said reinforcing agent is glass, carbon, mica, aramid fibers or mixtures thereof.

6. The composition of claim 1, wherein composition component (1) comprises a mixture of about 60 weight percent or greater of a polyester and up to about 40 weight percent of a synthetic, aliphatic polyamide.

7. The composition of claim 1, further comprising (4) a silane compound.

8. The composition of claim 7, wherein the silane compound is present in an mount up to about 0.4 weight percent, based on the total weight of (1)+(2)+(3)+(4) only.

9. The composition of claim 3 wherein the flame retardant is 3(b).

10. The composition of claim 3 wherein the flame retardant is 3(c).

11. A molded article made from the composition of any of claims 1, 2, 4, 5–8 and 9–10.

* * * * *

UNITED STATES PATENT AND TRADEMARK OFFICE
CERTIFICATE OF CORRECTION

PATENT NO. : 5,708,065
DATED : Jan. 13, 1998
INVENTOR(S) : Martens et al.

It is certified that error appears in the above-identified patent and that said Letters Patent is hereby corrected as shown below:

Column 18, line 45, delete "mount" and insert -- amount --.

Column 18, line 52, delete "2,4" and insert -- 2-4 --.

Signed and Sealed this

Fifth Day of May, 1998

*Attest:*

BRUCE LEHMAN

*Attesting Officer*  *Commissioner of Patents and Trademarks*